(12) United States Patent
Wilmington

(10) Patent No.: US 6,768,592 B2
(45) Date of Patent: Jul. 27, 2004

(54) OPTICAL COMBINERS

(75) Inventor: Iain K Wilmington, Maidstone (GB)

(73) Assignee: BAE Systems Electronics Limited, Farnborough (GB)

( * ) Notice: Subject to any disclaimer, the term of this patent is extended or adjusted under 35 U.S.C. 154(b) by 0 days.

(21) Appl. No.: 10/181,766

(22) PCT Filed: Jan. 26, 2001

(86) PCT No.: PCT/GB01/00322
§ 371 (c)(1),
(2), (4) Date: Jul. 22, 2002

(87) PCT Pub. No.: WO01/59506
PCT Pub. Date: Aug. 16, 2001

(65) Prior Publication Data
US 2003/0002166 A1 Jan. 2, 2003

(30) Foreign Application Priority Data
Feb. 11, 2000 (GB) .............................................. 0003036

(51) Int. Cl.[7] .............................................. G02B 27/14
(52) U.S. Cl. ........................ 359/634; 359/722; 359/737
(58) Field of Search ................................ 359/634, 722, 359/737, 767

(56) References Cited
U.S. PATENT DOCUMENTS
5,568,317 A 10/1996 Bohn et al. .................. 359/618

5,646,783 A 7/1997 Banbury ...................... 359/630
5,724,185 A 3/1998 Hickey et al. ............... 359/500
5,896,232 A 4/1999 Budd et al. .................. 359/630

FOREIGN PATENT DOCUMENTS
| EP | 0 190 614 | 8/1986 |
| EP | 0 422 583 A | 4/1991 |
| GB | 586845 | 4/1947 |
| JP | 61 126501 A | 6/1986 |
| JP | 3-275537 | 12/1991 |

Primary Examiner—David N. Spector
(74) Attorney, Agent, or Firm—Nixon & Vanderhye P.C.

(57) ABSTRACT

A combiner (10) has a glass reflector (11) with first and second curved surfaces (12, 13) each having an optical coating. A first prism (14) has a surface (15) which complements the surface (12) of the reflector (11) and a second prism (16) has a surface (17) which complements the surface (13) of the reflector (11). The surfaces (12 and 13) and the surfaces (15 and 17) are each primed and allowed to dry before being polished. The reflector (11) and prisms (14 and 16) are arranged with respect to one another such that surface (12) forms a well (18) with surface (15) and similarly surface (13) forms a well (19) with surface (17). The wells (18, 19) are completed with a seal (20) at a lower end (21) and bonding agent (22, 23) is injected into the wells (18, 19). The combiner (10) is placed in a vacuum chamber to remove trapped air bubbles and the agent (22, 23) is allowed to cool at a temperature which does not unduly stress the reflector (11) and prisms (14 and 16).

15 Claims, 1 Drawing Sheet

U.S. Patent      Jul. 27, 2004      US 6,768,592 B2
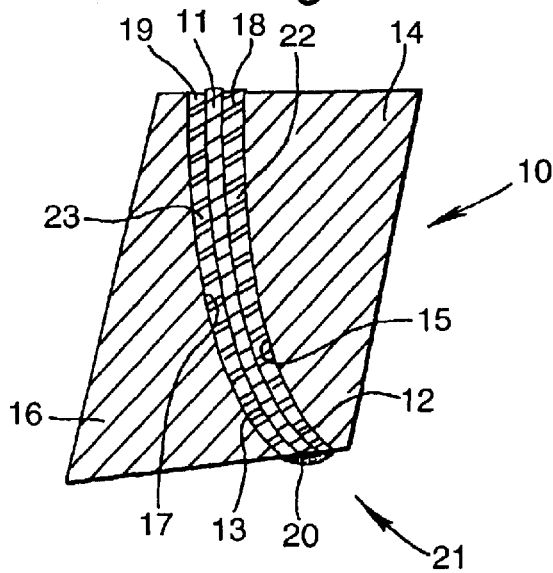
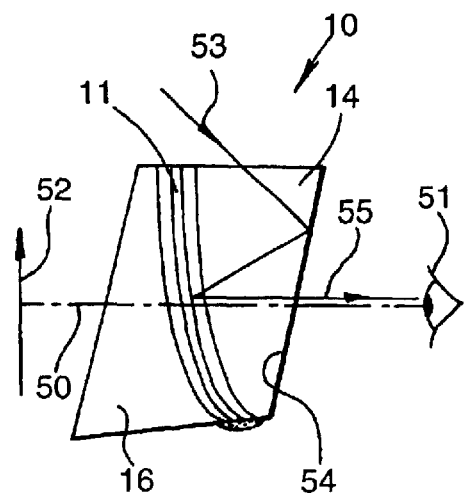
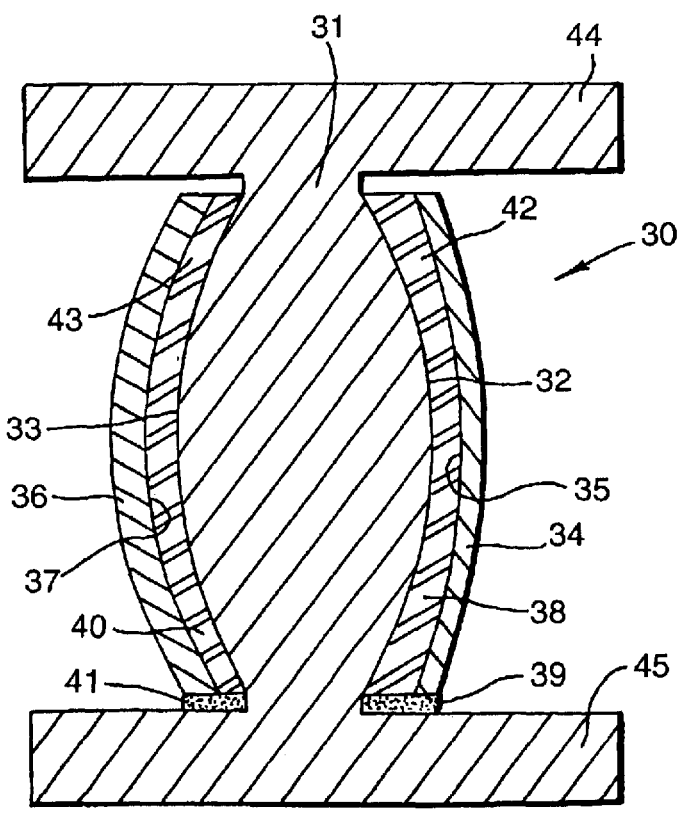

OPTICAL COMBINERS

This application is the US national phase of international application PCT/GB01/00322 filed Jan. 26, 2001, which designated the US.

The present invention relates to a combiner and a method of forming a combiner.

A combiner is conventionally formed from a first glass prism having a surface arranged to carry a dielectric coating applied to the surface, such that the dielectric coating is arranged to reflect light from an image, and a second glass prism having a surface bonded to the surface of the first glass prism using optical cement. In this manner, when a user, typically a pilot of an aircraft, views a scene through the combiner, the image appears to be superimposed on the scene. It will be understood that an image generator, such as a cathode ray tube, flat panel display or another suitable image generating means, can generate an image containing information such as primary flight data relating to the aircraft, for example, navigation and guidance information or cues for the user to follow. Therefore, the image can be conveyed to the user so as to overlay a scene viewed by the user through the combiner such that the user does not need to look away from the scene, for example to read primary flight data from a head down display, and the image is provided at infinity such that the eye of the user does not need to be refocused in order to view the image.

However, if the combiner is to be used as part of or an attachment to headgear, such as a helmet or goggles, worn by the user then the weight of the combiner will increase the mass required to be supported by the head and particularly the neck of the user, thereby increasing user fatigue when using the headgear. Furthermore, the safety of the user can also be compromised, particularly during ejection from the aircraft. Accordingly, the headgear or a part thereof needs to be removed prior to ejection of the user from the aircraft.

The weight of the combiner can be reduced by replacing the first and second glass prisms with a pair of plastic prisms formed from one of a range of optical plastics. Such plastics have been used to form lenses in optical systems for many years where light weight, safety or cost effectiveness of a mass produced lens is desirable. However, these plastics are relatively unstable materials to polish or to manufacture to a high precision, for example by moulding, due to their physical properties. When such plastics are polished or moulded they deform under manufacturing stress which causes the finished surface of the prism to differ to that original intended. Furthermore, the surface of the plastic is soft making a smooth polished finish difficult to achieve.

Furthermore, perhaps more importantly, without special techniques, which are still under development, an optical coating applied to a plastic surface is of a much poorer quality than an optical coating applied to a glass surface. That is the optical coating tends to craze thereby hazing the user's vision of a scene viewed through the combiner or the optical coating may peel from the plastic surface.

It is an object of the present invention to obviate or mitigate the disadvantages associated with the prior art.

According to a first aspect of the invention, a combiner comprises a glass reflector having a surface, a plastic prism having a surface arranged to adhere to the surface of the glass reflector, and a bonding agent arranged to adhere the surface of the glass reflector to the surface of the prism, wherein the bonding agent is arranged to allow the glass reflector and the plastic prism to expand and contract at different rates with respect to one another.

In this manner, the different rates of expansion and contraction, that is the difference in the expansion coefficient between the glass reflector and the plastic prism can be absorbed by the bonding agent used to adhere the glass reflector to the plastic prism during thermal cycling.

The surface of the glass reflector may be curved and the surface of the plastic prism may be arranged to complement the surface of the glass reflector. The surface of the glass reflector may also comprise a dielectric coating. In this manner, an optical coating can be disposed at the surface of the glass reflector thereby inhibiting crazing associated with disposing an optical coating on a surface of a plastic prism.

Preferably, the glass reflector may have a second surface arranged to adhere to a surface of a second plastic prism, and a bonding agent may be arranged to adhere the second surface of the glass reflector to the surface of the second plastic prism. The second surface of the glass reflector may also comprise a dielectric coating. The second surface of the glass reflector may be curved and the surface of the second plastic prism may be arranged to complement the second surface of the glass reflector.

Alternatively, the plastic prism may have a second surface arranged to adhere to a surface of a second glass reflector, and a bonding agent may be arranged to adhere the second surface of the plastic prism to the surface of the second glass reflector. The surface of the second glass reflector may also comprise a dielectric coating. The surface of the second glass reflector may be curved and the second surface of the plastic prism may be arranged to complement the surface of the second glass reflector.

The or each glass reflector may be a pellicle reflector. The bonding agent may be a flexible silicone adhesive.

Preferably, the combiner may be an eyepiece combiner arranged to form part of a helmet mounted display system. A combiner according to the invention is lighter than a conventional combiner formed from glass incorporate within headgear to be worn by a user, therefore the combiner reduces the loading of the headgear on the neck of the user and the user may eject from the aircraft while wearing the headgear incorporating the combiner.

According to a second aspect of the invention, as method of forming a combiner includes forming a surface on a glass reflector, forming a surface on a plastic prism and arranging the surface to adhere to the surface of the glass reflector, and bonding the surface of the glass reflector to the surface of the prism, such that the bonding agent is arranged to allow the glass reflector and the plastic prism to expand and contract at different rates with respect to one another.

The method may include priming the surface of the glass reflector and the surface of the plastic prism prior to bonding the surfaces to one another. The method may include coating the surface of the glass reflector with a dielectric coating prior to priming the surface of the glass reflector.

Preferably, the method may include forming a second surface on the glass reflector, forming a surface on a second plastic prism and bonding the second surface of the glass reflector to the surface of the second plastic prism. The method may include priming the second surface of the glass reflector and the surface of the second plastic prism prior to bonding the surfaces to one another. The method may include coating the second surface of the glass reflector with a dielectric coating prior to priming the second surface of the glass reflector.

Alternatively, the method may include forming a second surface on the plastic prism, forming a surface on a second glass reflector and bonding the second surface of the plastic prism to the surface of the second glass reflector. The method may include priming the second surface of the plastic prism and the surface of the second glass reflector prior to bonding the surfaces to one another. The method may include coating the surface of the second glass reflector with a dielectric coating prior to priming the surface of the second glass reflector.

The method may include forming the or each surfaces such that it is curved.

The invention will now be described, by way of example only, with reference to the accompanying drawings, in which:

FIG. 1 illustrates in cross section a combiner according to a first embodiment of the invention;

FIG. 2 illustrates in cross section a combiner according to a second embodiment of the invention, and FIG. 3 schematically illustrates a combiner as shown in FIG. 1 used as part of a head up display system.

The inventor has realised that the difference in quality of an optical coating on a plastic surface as opposed to a glass surface is due to the dielectric material used to form the optical coating. Dielectric materials, which are applied to the plastic surface in a number of thin layers to constitute the optical coating, have similar physical properties to those of glass and thus there exists a large difference in thermal expansion coefficient between the dielectric materials used to form the optical coating and the thermal expansion coefficient of the plastic surface. This leads to a crazing effect of the optical coating after thermally cycling which effects a user's vision of a scene viewed through the plastic surface and the optical coating.

Furthermore, the inventor has also realised that a plastic surface has a lower melting point compared with a glass surface and thus the deposition of an optical coating on to a plastic surface must be done at a substantially lower temperature compared with deposition of the optical coating on a glass surface. This results in a poorer adhesion of the optical coating to the plastic surface than can be achieved between an optical coating and a glass surface.

In FIG. 1, a first embodiment of the invention comprises a combiner 10 having a glass reflector 11, such as a glass pellicle reflector, that has first and second curved surfaces 12 and 13 that have an optical coating, not illustrated, on either or both of the surfaces 12, 13. A first plastic prism 14 has a surface 15 arranged to complement the curved surface 12 of the glass reflector 11. A second plastic prism 16 has a surface 17 arranged to complement the second curved surface 13 of the glass reflector 11. The first and second curved surfaces 12 and 13 and the surfaces 15 and 17 of the first and second plastic prisms 14 and 16 are each primed with a suitable primer which is allowed to dry and is then polished.

The glass reflector 11, first plastic prism 14 and second plastic prism 16 are arranged with respect to one another such that the first curved surface 12 of the glass reflector 11 forms a well 18 with the surface 15 of the first plastic prism 14. Similarly, the second curved surface 13 of the glass reflector 11 forms a well 19 with the surface 17 of the second plastic prism 16.

It will be understood that the glass reflector 11, first plastic prism 14 and second plastic prism 16 can be retained in position relative to one another using a jig, not illustrated.

The wells 18 and 19 are completed with a seal 20 arranged to close the wells 19 and 20 at a lower end 21. That is, the gap between the first curved surface 12 of the glass reflector and surface 15 of the first plastic prism 14 and the second curved surface 13 of the glass reflector 11 and surface 17 of the second plastic prism 16 are sealed at the lower end 21. The seal 20 may be formed from a flexible silicone material.

A bonding agent 22, represented by double hatchings in FIG. 1, is then injected into the wells 18 and 19 so as to fill the wells 18 and 19. The combiner 10 is then placed in a vacuum chamber to remove any trapped air bubbles within the wells 18 and 19. The bonding agent 22, 23 is then allowed to cure at a temperature which will not unduly stress the glass reflector 11, first plastic prism 14 and second plastic prism 16.

It will be understood, that a dielectric coating, not illustrated, can be applied to either the first curved surface 12 or second curved surface 13, or indeed both surfaces 12 and 13, prior to the surfaces 12 and 13 being primed and the glass reflector 11 being adhered to the first and second plastic prisms 14 and 16. It will be understood that the optical coating has both light transmissive and light reflective properties. In this manner, a combiner 10, suitable for use as an eyepiece in a head up display, can be formed from materials lighter than a conventional combiner using a pair of glass prisms bonded to one another.

The bonding agent 22, 23 is formed from a flexible silicone material arranged to compensate for the different rates of expansion and contractions, that is the difference in the expansion coefficient between the glass reflector 11 and the first and second plastic prisms 12 and 16. Therefore, when the combiner 10 is caused to expand or contract during thermal cycling the adhesive will absorb shear stress caused by the different expansion coefficients, thereby providing a means to suitably adhere the glass reflector 11 to the first and second and plastic prisms 14 and 16. Furthermore, the crazing associated with prior art optical coating on a plastic surface is obviated as the optical coating is applied to a glass surface of the glass reflector 11. Furthermore, the glass reflector 11 will have a greater range of reflective indices and dispersive properties compared with a plastic surface having the same optical coating.

It will be understood that the first curved surface 12 may be simply curved or may be concaved, that is substantially spherical. Similarly, the second curved surface 13 may be simply curved to complement the first curved surface 12 or may be convex, that is substantially spherical, to complement the first curved surface 12.

The second plastic prism 16 tends to distort light passing through its body, thereby causing distortion of the scene as viewed by a user. Therefore, the first plastic prism 14 is arranged to correct distortions generated by the second plastic prison 16.

In FIG. 2, a second embodiment of the invention, comprises a combiner 30 having a plastic prism 31 which has a first curved surface 32 and a second curved surface 33. A first glass reflector 34 has a surface 35 arranged to complement the first curved surface 32 of the plastic prism 31 and a second glass reflector 36 having a surface 37 arranged to complement the second curved surface 33 of the plastic prism 31. The first and second curved surfaces 32 and 37 of the plastics prism 31 and the surfaces 35 and 37 respectively of the first and second reflectors 34 and 36 are each primed with a suitable primer which is allowed to dry and is then polished. The first and second glass reflectors 34 and 36 can be glass pellicle reflectors.

The first glass reflector 34 is arranged with respect to the plastic prism 31 such that the first curved surface 32 and surface 35 of the first glass reflector 34 form a well 38 and a seal 39 closes an end of the well 38. The seal 39 can be formed from a flexible silicone material.

Similarly, the second glass reflector 36 and plastic prism 31 may be arranged with respect to one another such that the first curved surface 32 and surface 37 of second glass reflector 36 form a well 40 closed at one end with a seal 41. Again, the seal 41 can be formed from a flexible silicone material.

It will be understood, that the plastic prism 31 and the first and second glass reflectors 34 and 36 may be held with respect to one another using a jig, not illustrated.

Bonding agent 42 and 43, represented by double cross hatching in FIG. 2, is then injected into the wells 38 and 40. As in the embodiment illustrated in FIG. 1, the combiner 30 is placed in a vacuum chamber so as to remove any air bubbles in the bonding agent 42, 43 and the bonding agent 42, 43 is allowed to cure at a temperature which does not unduly stress the plastic prism 31 and the first and second glass reflectors 34 and 36.

In this embodiment, the plastic prism 31 has extensions 44 and 45 to provide a suitable mounting position for the combiner 30 within an optical system, not illustrated.

It will be understood that the first and second curved surfaces 32 and 33 of the prism 31 may be curved or convex, that is substantially spherical, and that the surfaces 35 and 37 respectively of the first and second glass reflectors 34 and 36 can be concaved to complement their respective curved surface 32, 33.

The second glass reflector 36 tends to distort light passing through its body, thereby causing distortion of the scene as viewed by a user. Therefore, the first glass reflector 34 is arranged to correct distortions generated by the second glass reflector 36.

In FIG. 3, in which like references have been used to indicate similar integers to those used in FIG. 1, a combiner 10 is positioned within a line of sight 50 of an eye 51 of a user, not illustrated. The eye 51 views a scene 52, in this instance indicated by an arrow, through the combiner 10. An image, not illustrated, formed by an image generator and optical system associated with the combiner 10, also not illustrated, follows a light path 53 and the image is internally reflected from an aft surface 54, of the first plastic prism 14, into the first curved surface 12 of the glass reflector 10. The optical coating disposed on the first curved surface 12 then reflects the image to follow a light ray path 55 along the line of sight 50 of the eye 51. Accordingly, the user of the combiner 10, typically a pilot of an aircraft, views the scene 52 through the combiner 10, that is through the optical coating, and the image appears to be superimposed on the scene 52. Therefore, an image, which can represent primary flight data relating to the aircraft, can be conveyed to an eye 51 of the user so as to overlay a scene 52 viewed by the eye 51 through the combiner 10 such that the user does not need to look away from the scene 52, for example to read primary flight data from a head down display, and the image is provided at infinity such that the eye 51 of the user does not need to be refocused in order to view the image. It will be understood that the combiner 30 illustrated in FIG. 2 operates in a similar manner to that described with reference to FIGS. 1 and 3.

It will also be understood that although the invention is described and predominately intended for use as a combiner, especially as an eyepiece combiner, to convey information to a pilot, the invention can find applications in other environments where information needs to be conveyed to a user such that the user does not need to look away from a scene viewed through the combiner. For example, a combiner according to the invention could be used in other transportation vehicles and to convey information from a central location to a user.

What is claimed is:

1. A combiner, comprising
a glass reflector having a surface,
a plastic prism having a surface arranged to adhere to the surface of the glass reflector, and
a bonding agent arranged to adhere the surface of the glass reflector to the surface of the prism,
wherein the bonding agent is arranged to allow the glass reflector and the plastic prism to expand and contract at different rates with respect to one another.

2. A combiner, as in claim 1, wherein the surface of the glass reflector is curved and the surface of the plastic prism is arranged to complement the surface of the glass reflector.

3. A combiner, as in claim 1, wherein the surface of the glass reflector also comprises a dielectric coating.

4. A combiner, as in claim 1, wherein the glass reflector has a second surface arranged to adhere to a surface of a second plastic prism, and a bonding agent is arranged to adhere the second surface of the glass reflector to the surface of the second plastic prism.

5. A combiner, as in claim 4, wherein the second surface of the glass reflector also comprises a dielectric coating.

6. A combiner, as in claim 4, wherein the second surface of the glass reflector is curved and the surface of the second plastic prism is arranged to complement the second surface of the glass reflector.

7. A combiner, as in claim 1, wherein the glass reflector is a pellicle reflector.

8. A combiner, as in claim 1, wherein the bonding agent is a flexible silicone adhesive.

9. A method of forming a combiner, including
forming a surface on a glass reflector,
forming a surface on a plastic prism and arranging the surface to adhere to the surface of the glass reflector, and
bonding the surface of the glass reflector to the surface of the prism,
such that the bonding agent is arranged to allow the glass reflector and the plastic prism to expand and contract at different rates with respect to one another.

10. A method, as in claim 9, including priming the surface of the glass reflector and the surface of the plastic prism prior to bonding the surfaces to one another.

11. A method, as in claim 10, including coating the surface of the glass reflector with a dielectric coating prior to priming the surface of the glass reflector.

12. A method, as in claim 9, including forming a second surface on the glass reflector, forming a surface on a second plastic prism and bonding the second surface of the glass reflector to the surface of the second plastic prism.

13. A method, as in claim 12, including priming the second surface of the glass reflector and the surface of the second plastic prism prior to bonding the surfaces to one another.

14. A method, as in claim 13, including coating the second surface of the glass reflector with a dielectric coating prior to priming the second surface of the glass reflector.

15. A method, as in claim 9, including forming the surface such that it is curved.

* * * * *